United States Patent [19]
Chikama

[11] 3,871,365
[45] Mar. 18, 1975

[54] ENDOSCOPE
[75] Inventor: Toshio Chikama, Tokyo, Japan
[73] Assignee: Kabushiki Kaisha Machida Seisakusho, Tokyo, Japan
[22] Filed: June 6, 1973
[21] Appl. No.: 367,401

[30] Foreign Application Priority Data
June 19, 1972 Japan.................................. 47-60436

[52] U.S. Cl. ..................................................... 128/5
[51] Int. Cl............................................. A61b 1/00
[58] Field of Search .......... 128/5, 6, 7, 303.15, 305

[56] References Cited
UNITED STATES PATENTS
| | | | |
|---|---|---|---|
| 2,162,681 | 6/1939 | Ryan | 128/6 |
| 2,532,043 | 11/1950 | Wallace | 128/303.15 X |
| 3,561,432 | 2/1971 | Yamaki et al. | 128/6 |

FOREIGN PATENTS OR APPLICATIONS
| | | | |
|---|---|---|---|
| 1,231,169 | 4/1960 | France | 128/6 |
| 1,261,275 | 2/1968 | Germany | 128/6 |

Primary Examiner—Lucie H. Laudenslager

[57] ABSTRACT

An endoscope of the type in which a visual field extending from its front surface to one side surface is observable by turning a turnable portion of an image-receiving optical system mounted at the front portion of the endoscope. The endoscope is provided with a guide member which serves to hold the front end portion of a forceps, which is inserted through the endoscope, and arranged to be turnable in the same direction with the foregoing turnable portion of the optical system. At its base portion the endoscope has a mechanism for simultaneously or individually operating operation wires connected to the turnable portion of the optical system and the guide member, respectively.

6 Claims, 7 Drawing Figures

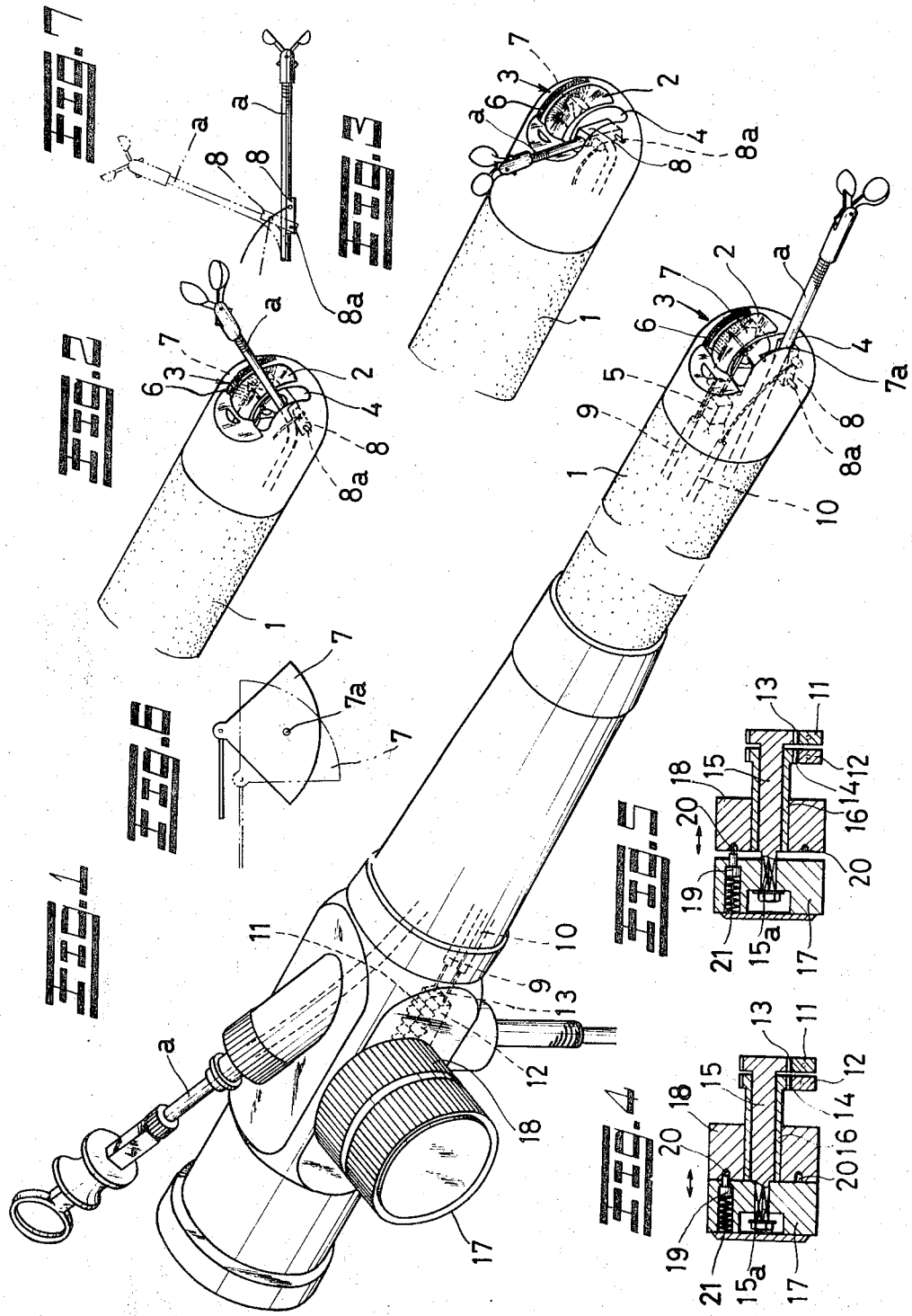

ENDOSCOPE

BRIEF SUMMARY OF THE INVENTION

This invention relates to an endoscope of the type having a window extending from its front surface to one side surface thereof to enable viewing a visual field, and more particularly to such an endoscope having a forceps associated therewith.

With such an endoscope, the front end of the forceps should always face the direction of observation of the visual field.

An object of the invention is to provide an endoscope of the above type in which as occasion demands, the visual field being observed can be changed and the direction of the front end of the forceps can also be changed.

According to the invention, an endoscope is provided comprising a front portion with the observation window, an image-receiving optical system including a turnable prism facing said window to view different portions of a visual field outside said window, a forceps projecting through said window, support means guidably supporting said forceps for pivotable movement, and an operating means coupled to said support means for the forceps and to said turnable prism of the optical system (a) to couple said support means and prism so that the forceps and prism move conjointly or (b) to enable the support means and prism to be individually operated to alter the relative position of the forceps and the prism.

The operation means comprises a separate operation member coupled to said support means and said prism, and two adjacent, coaxial, rotatable control knobs coupled to a respective operation member.

The knobs are normally coupled for common rotation but are capable of being uncoupled so as to be separately rotatable.

BRIEF DESCRIPTION OF THE DRAWING

FIG. 1 is a perspective view of a major portion of the endoscope according to this invention;

FIGS. 2 and 3 are perspective views of the front end portion of the endoscope in different operating conditions;

FIGS. 4 and 5 are sectional side views of a portion of a wire operating mechanism of the endoscope in different operating conditions; and FIGS. 6 and 7 are respective side elevation views of the prism portion and the guide member portion, respectively.

DETAILED DESCRIPTION

Referring to the drawing, numeral 1 denotes an endoscope which is provided at its front end with an observation window 2 extending from its front surface to one side surface thereof. At the observation window, the endoscope also includes an illuminating portion 3 and an opening 4 for projection thereof of a forceps a, both of which extend along the observation window 2. The endoscope is also provided at its interior with an image guide rod 5 and a light guide rod 6. A turnable prism 7 is pivotally mounted by a pivot 7a, in front of the image guide rod 5, so that by turning prism 7 a visual field extending from the front surface to the one side surface can be viewed through the observation window 2 and the image can be observed through the image guide rod 5 at the base end portion of the endoscope. The endoscope up to this point is conventional.

According to the invention, in the case where the forceps a is used with this kind of endoscope, a guide member 8 for holding the front end portion of the forceps a in the endoscope is pivotally mounted by a pivot 8a, within the opening 4 so as to be turnable in the same direction as the prism 7, so that by turning the guide member 8 simultaneously with the turning of the prism 7, the front end of the forceps a held and guided thereby can be always brought to face the visual field determined by the turning of the prism 7. In accordance with the invention, a means is provided so that as occasion demands, the prism 7 and the guide member 8 can also be individually turned.

One embodiment of such a means for this simultaneous or individual operation is constructed as follows: Operation wires 9, 10 are connected at their front ends to the prism 7 and the guide member 8, respectively, and at their rear ends the wires are connected to respective rack members 11, 12. Pinions 13, 14 are in respective engagement with the rack members 11, 12. The pinion 13 is mounted on a shaft 15 and the pinion 14 is mounted on a tubular shaft 16 loosely mounted on shaft 15. Rotary knobs 17, 18 are attached to end portions of the respective shafts 15, 16 and are disposed in adjacent coaxial relation. The rotary knob 17 is mounted on a smaller diameter shaft portion 15a of the shaft 15 so as to be slidable thereon in the longitudinal direction thereof but be turnable therewith, while the other rotary knob 18 is fixedly mounted on the tubular shaft 16. Additionally, the knob 17 receives a spring-loaded pin 19 while the knob 18 is provided with pin holes 20 for receiving the pin 19. The pin 19 is urged by spring 21 so as to project from the surface of the knob 17, and the pin holes 20 are distributed along the turning circle of the pin 19 so that the pin 19 may be selectively fitted into any one of the holes 20.

In the case where the endoscope 1 is used with the forceps a inserted therethrough as shown in FIG. 1, if the prism 7 is in its forward observing position as shown in the same Figure, the front end of the forceps a, held and guided by the guide member 8, projects in the direction of the forwardly observed visual field. When the observed visual field is varied sidewards by turning the prism 7 as shown in FIGS. 2 and 3, the guide member 8 is simultaneously turned in the same direction and thereby the front end of the forceps a can be brought to always face in the direction of the observed visual field. Namely, if one of the rotary knobs 17, 18 is turned in a predetermined direction under the condition as shown in FIG. 4 the two rotary knobs 17, 18 are coupled together by engagement of the pin 19 in any of the pin holes 20, and the two shafts 15, 16 are simultaneously turned. Hence, by the engagement of the pinions 13, 14 with the rack members 11, 12 the respective operation wires 9, 10 are operated in the same direction and thereby the prism 7 and the guide member 8 are simultaneously turned in the same direction.

In the case where as occasion demands, the prism 7 or the guide member 8 is to be individually turned, the rotary knob 17 is pulled outwards as shown in FIG. 5 so that the engagement thereof with the rotary knob 18 through the pin 19 and the pin hole 20 is released and then either one of the knobs 17, 18 is selectively turned. In this case, the direction of the visual field and the direction of the forceps can be individually adjusted, and this is especially advantageous in bringing the direction of the forceps to face the visual field exactly, even in the case where, for example, by the simultaneous turning of the prism 7 and the guide member 8, the position of the front end of the forceps is not brought in the direction of the prism because of the existence of a difference in bending property of the forceps depending on its size.

Thus, according to this invention, the guide member for the forceps is so mounted as to be turnable in the same direction with the turnable prism and a means for simultaneously or individually turning them is provided, so that when the forceps is used, the front end thereof can always be brought to face the center of the visual field. Thereby, the utilization of the endoscope can be substantially improved.

What is claimed is:

1. An endoscope comprising a front portion with an observation window, an image-receiving optical system including a turnable member facing said window to view different portions of a visable field outside said window, a forceps projecting through said window, support means guidably supporting said forceps for pivotable meovement, and an operating means coupled to said support means for the forceps and to said turnable member of the optical system selectively to (a) couple said support means and turnable member so that the forceps and turnable member move conjointly and (b) to enable the support means and turnable member to be individually operated to alter the relative position of the forceps and the turnable member of the optical system, said operating means comprising a first operation member for said support means, a second separate operation member for said turnable member of the optical system, two adjacent, coaxial, rotatable control knobs each coupled to a respective operation member, means normally coupling the knobs for common rotation movement but capable of being rendered inoperative to allow separate rotation of the knobs, said means coupling the knobs comprises respective shafts supporting the knobs, and means separably connecting the knobs, said knobs being axially displaceable relative to one another on said shafts to disconnect the knobs.

2. An endoscope as claimed in claim 1 wherein the means separably connecting the rods comprises a spring-loaded pin in one knob, the other knob having holes for receiving the pin.

3. An endoscope as claimed in claim 1 wherein one of said shafts is tubular and is rotatable on the other.

4. An endoscope as claimed in claim 3 wherein one of said knobs is secured to the tubular shaft and the other knob is mounted on the other shaft for common rotation therewith while being axially slidable thereon.

5. An endoscope as claimed in claim 1 wherein said operation means comprises pinions attached to said shafts, and racks in mesh with said pinions and operatively connected to said operation members.

6. An endoscope as claimed in claim 5 wherein said operation members are wires.

* * * * *